US012583481B1

(12) United States Patent
Sheu et al.

(10) Patent No.: US 12,583,481 B1
(45) Date of Patent: Mar. 24, 2026

(54) DETERMINING THE PICK-UP/DROP-OFF STATE OF A MASS TRANSIT VEHICLE

(71) Applicant: Waymo LLC, Mountain View, CA (US)

(72) Inventors: Kevin Sheu, San Jose, CA (US); Qiurui He, Sunnyvale, CA (US); Aishwarya Parasuram, Sunnyvale, CA (US); Selina Pan, Cupertino, CA (US); David Lee, San Carlos, CA (US); Qichi Yang, Los Altos, CA (US); Kishore Kollipara, Pacifica, CA (US); Nayun Xu, Mountain View, CA (US); Maya Kabkab, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/528,007

(22) Filed: Dec. 4, 2023

(51) Int. Cl.
*B60W 60/00* (2020.01)
*B60W 50/06* (2006.01)

(52) U.S. Cl.
CPC ...... *B60W 60/00253* (2020.02); *B60W 50/06* (2013.01); *B60W 2554/80* (2020.02); *B60W 2556/40* (2020.02)

(58) Field of Classification Search
CPC .......... B60W 60/00253; B60W 50/06; B60W 2554/80; B60W 2556/40
See application file for complete search history.

(56) References Cited

U.S. PATENT DOCUMENTS 11,453,416 B2 9/2022 Metzner et al.
11,577,722 B1 * 2/2023 Packer ................. G05D 1/0088

12,065,075 B2 * 8/2024 Bandi .................... G06V 20/58
12,151,681 B2 * 11/2024 Namba ........... B60W 30/18163
2012/0065858 A1 * 3/2012 Nickolaou ............. B60Q 9/008
                                                              701/1
2018/0203457 A1 * 7/2018 Moosaei .............. G05D 1/0246
2019/0152450 A1 * 5/2019 Weber ...................... B60Q 9/00
2020/0079371 A1 * 3/2020 Sakamoto ............. G06V 40/20
2021/0018916 A1 * 1/2021 Thakur .................... G07C 5/08
(Continued)

FOREIGN PATENT DOCUMENTS

CN        115775372 A  *  3/2023
JP          7681504 B2  *  5/2025
WO      2022148829 A1     7/2022

OTHER PUBLICATIONS

"Hu, Jia; Lee, Young-Jae; Park, Byungkyu Brian; Transit signal priority accommodating conflicting requests under Connected Vehicles technology; Jun. 2016; Transportation Research Part C 69" (Year: 2016).*

*Primary Examiner* — Ramya P Burgess
*Assistant Examiner* — Christopher R Cardimino
(74) *Attorney, Agent, or Firm* — Lowenstein Sandler LLP

(57) ABSTRACT

Systems and methods for determining a passenger pick-up/ drop-off (PUDO) state of a mass transit vehicle by an autonomous vehicle (AV) are disclosed. A system includes a memory one or more processing devices, coupled to the memory, configured to perform operations that include identifying a mass transit vehicle in an environment of an AV, responsive to determining the mass transit vehicle is in a PUDO state, providing movement instructions to a planning system of the AV, and autonomously modifying operation of the AV based on the movement instructions.

20 Claims, 7 Drawing Sheets

(56)                    References Cited

U.S. PATENT DOCUMENTS

| | | | |
|---|---|---|---|
| 2022/0137623 A1* | 5/2022 | Goyal | G05D 1/0214 |
| | | | 701/23 |
| 2023/0114638 A1* | 4/2023 | Conroy | G06Q 10/047 |
| | | | 701/23 |
| 2024/0025440 A1* | 1/2024 | Lepird | G06V 10/764 |
| 2024/0304086 A1* | 9/2024 | Dürr | G08G 1/096725 |
| 2024/0375645 A1* | 11/2024 | Perez Barrera | B60W 60/0027 |

* cited by examiner

Determining a distance of a cable car from a passenger
PUDO zone
510

Determining a velocity of the cable car and a presence of
one or more pedestrians in the environment of the AV
520

Determining that the cable car is in a temporal vicinity of a
PUDO state and modifying operation of the AV
530

DETERMINING THE PICK-UP/DROP-OFF STATE OF A MASS TRANSIT VEHICLE

TECHNICAL FIELD

The instant specification generally relates to autonomous vehicles. More specifically, the instant specification relates to determining the pick-up or drop-off state of a mass transit vehicle.

BACKGROUND

Autonomous vehicles (AVs), whether fully autonomous or partially self-driving, operate by sensing an outside environment with various sensors (e.g., radar, optical, audio, etc.). This outside environment may include mass transit vehicles, which can include light rail vehicles (LRVs) and cable cars (sometimes called "cable trams" or "trolleys"). Traffic laws require certain behavior for vehicles when a LRV or cable car is picking up or dropping off passengers, and AVs should follow such laws and other procedures in order to behave safely around these LRVs and cable cars.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 4 depicts a top-down view illustrating an example driving environment of an AV configured to determine the PUDO state of a mass transit vehicle, in accordance with some implementations of the present disclosure.

SUMMARY

Figure 1:
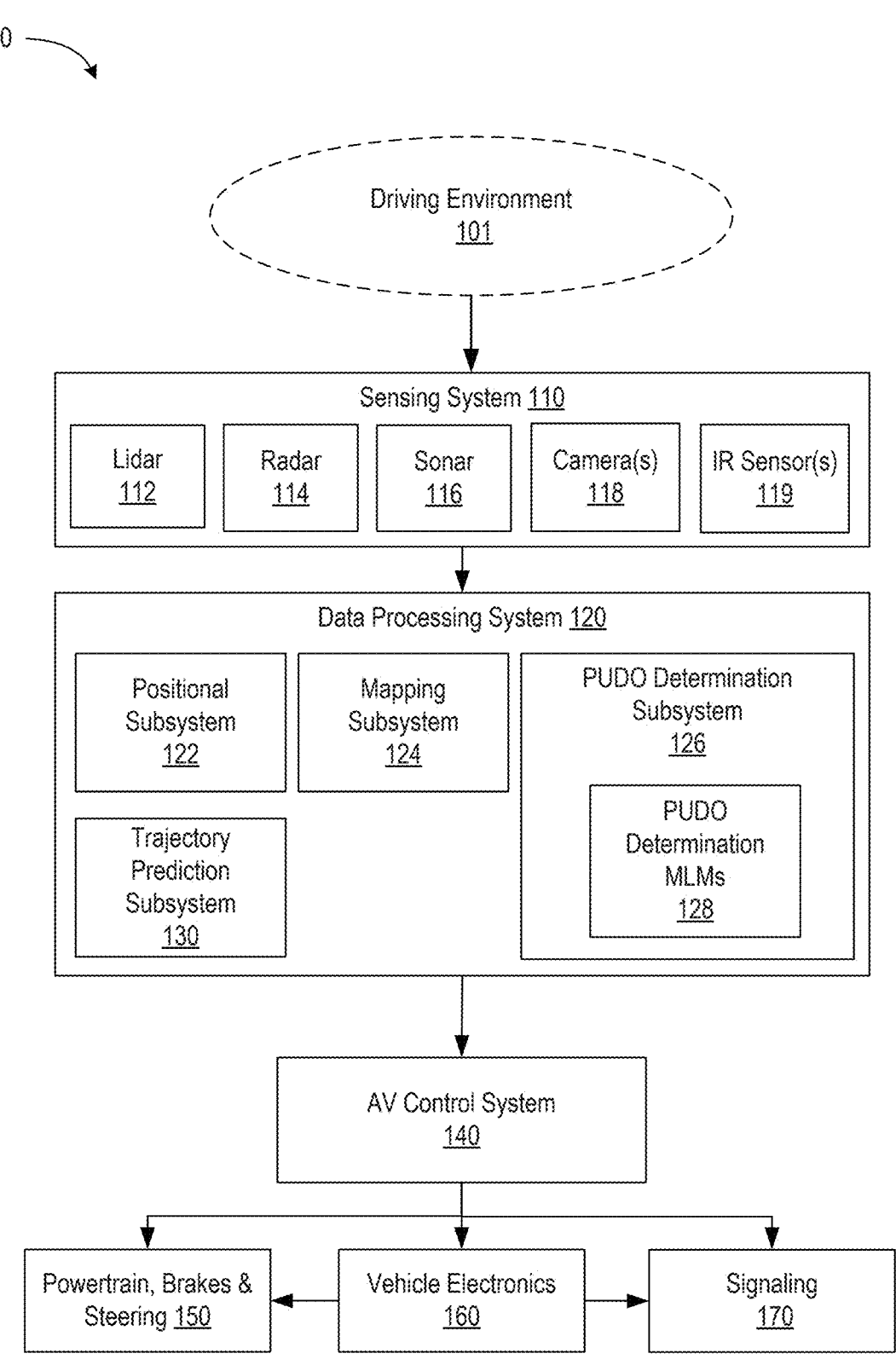
FIG. 1 depicts a block diagram of an example autonomous vehicle (AV) capable of determining the pick-up/drop-off (PUDO) state of a mass transit vehicle, in accordance with some implementations of the present disclosure.

In one implementation, disclosed is a system for determining the pick-up or drop-off (PUDO) state of a mass transit vehicle. The system includes a memory and one or more processing devices coupled to the memory. The one or more processing devices are configured to perform one or more operations. The operations include identifying a mass transit vehicle in an environment of an autonomous vehicle (AV). The mass transit vehicle can include a cable car or a light rail vehicle (LRV). The operations include, responsive to determining if the mass transit vehicle is in a PUDO state, providing movement instructions to a planning system of the AV. The operations include modifying the operation of the AV based on the movement instructions.

In another implementation, disclosed is another system for determining the PUDO state of a cable car. The system includes a memory and one or more processing devices coupled to the memory. The one or more processing devices are configured to perform one or more operations. The operations include determining, based on map data obtained from a mapping system of an AV, a distance of the cable car from a PUDO zone. The cable car is located in an environment of the AV. The operations include determining, based on sensor data obtained from a sensing system of the AV, a velocity of the cable car and a presence of one or more pedestrians in the environment of the AV. The operations include determining, based at least on the distance and the velocity, that the cable car is in a temporal vicinity of a PUDO state and modifying operation of the AV.

In another implementation, disclosed is a method for determining the PUDO state of a cable car. The method includes determining, based on first map data obtained from a mapping system of an AV, a distance of a cable car from a PUDO zone. The cable car is located in an environment of the AV. The method includes determining, based on sensor data obtained from a sensing system of the AV, a velocity of the cable car and a presence of one or more pedestrians in the environment of the AV. The method includes determining, based at least on the distance and the velocity, that the cable car is in a temporal vicinity of a PUDO state and modifying operation of the AV.

DETAILED DESCRIPTION

An autonomous vehicle or a vehicle deploying various driving assistance features (AV) should safely and efficiently navigate in an environment of the AV. The environment can include road features (e.g., the geometry of a road, road lanes, curves in a road, etc.), traffic light states (e.g., whether a light indicates that vehicles should move, slow down, or stop), immobile objects (e.g., barriers, construction cones, foreign object debris (FOD), etc.), mobile objects (e.g., other vehicles, pedestrians, cyclists, etc.), or other things that can appear in a driving environment. The AV should plan its own trajectory and positioning to avoid collisions with objects, all while following the rules of the road.

The AV may encounter light rail vehicles (LRVs) and cable cars in the driving environment. For example, the AV may share a lane with an LRV or cable car or may drive in a lane next to a lane that includes a LRV or cable car. Traffic laws can require vehicles to operate in specific ways around LRVs and cable cars when these vehicles are in a passenger pick-up/drop-off (PUDO) state, e.g., the LRV or cable car is picking up or dropping off passengers. Such laws can include that when a LRV or cable car is in a PUDO state, a vehicle behind the LRV or cable car should stop a safe distance behind the LRV or cable car (whether in the same lane as, or in a lane parallel to, the LRV or cable car) and cannot go around the LRV or cable car.

It can be difficult for an AV to determine if a LRV or cable car is in a PUDO state. For LRVs, the LRV may be in a PUDO state when its passenger doors are open. However, it can be difficult for the AV to detect if the LRV's doors are open, especially if the LRV is in the same lane as the AV since the AV may not be able to optically view the sides of the LRV. For cable cars, it can be even more difficult to determine whether a cable car is in the PUDO state because some cable cars do not have passenger doors. Instead, the cable car has openings through which passengers pass to reach the interior of the cable car or a platform on the cable car. Furthermore, passengers sometimes stand near or even outside these openings, often when the cable car is full of passengers. The lack of doors and passengers gathered around an opening on the cable car make it difficult for the AV to determine when a cable car is in a PUDO state or whether the cable car is stopped but not picking up or dropping off passengers.

Aspects and implementations of the present disclosure address these and other challenges of existing AV systems. The systems and methods disclosed herein utilize one or more machine learning models (MLMs) to determine whether a LRV or cable car is in a PUDO state. Based on the output(s) of these one or more MLMs, the AV controls its operations to comply with traffic laws and navigate safely in the environment of the AV and the LRV or cable car. The systems and methods also provide functionality for addressing whether the AV has generated a false positive when determining whether a LRV or cable car is in a PUDO state (e.g., when the AV has determined a cable car is possibly in a PUDO state, but the cable car is not actually picking up or dropping off passengers).

The advantages of the disclosed techniques and systems include, but are not limited to, automatically and more accurately determining by MLMs whether a LRV or cable car is in a PUDO state and reduced use in computational resources that would be otherwise consumed by the AV when unnecessarily stopping due to an incorrect determination that the LRV or the cable car is in a PUDO state. Such reduced use of computational resources can include, but are not limited to reduced processing device usage, memory usage, storage space usage, and other reduction in the use of computational resources. Further advantages of the disclosed techniques and systems include providing an AV that complies with driving regulations.

In those instances where the description of implementations refers to autonomous vehicles, it should be understood that similar techniques can be used in various driver assistance systems that do not rise to the level of fully autonomous driving systems. More specifically, disclosed techniques can be used in Society of Automotive Engineers (SAE) Level 2 driver assistance systems that implement steering, braking, acceleration, lane centering, adaptive cruise control, etc., as well as other driver support. Likewise, the disclosed techniques can be used in SAE Level 3 driving assistance systems capable of autonomous driving under limited (e.g., highway) conditions. In such systems, fast and accurate detection and tracking of mobile objects can be used to inform the driver of the approaching objects, with the driver making the ultimate driving decisions (e.g., in SAE Level 2 systems), or to make certain driving decisions (e.g., in SAE Level 3 systems), such as reducing speed, changing lanes, etc., without requesting driver's feedback.

In those instances where the description of implementations refers to MLMs, it should be understood that an MLM can refer to a variety of MLMs. For example, an MLM can include an artificial neural network (ANN), which can include multiple nodes ("neurons") arranged in one or more layers, and a neuron may be connected to one or more neurons via one or more edges ("synapses"). The synapses may perpetuate a signal from one neuron to another, and a weight, bias, or other configuration of a node or synapse may adjust a value of the signal. The ANN can undergo training to adjust the weights or adjust other features of the ANN. Such training may include inputting sensor data or other information into the ANN and adjusting the ANN's features in response to an output of the ANN. An ANN may include a deep learning ANN, which may include an ANN with a large number of neurons, synapses, or layers. An MLM may include another type of MLM, such as clustering, decision trees, Bayesian networks, or the like.

FIG. 1 is a diagram illustrating components of an example AV 100 capable of determining the PUDO state of a mass transit vehicle, in accordance with some implementations of the present disclosure. The AV 100 can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

An environment 101 of the AV 100 (sometimes referred to as the "driving environment") can include any objects (animated or non-animated) located outside the AV 100, such as roadways, buildings, trees, bushes, sidewalks, bridges, mountains, other vehicles, pedestrians, animals, and so on. The driving environment 101 can be urban, suburban, rural, and so on. In some implementations, the driving environment 101 can be substantially flat, with various objects moving parallel to a surface (e.g., parallel to the surface of the Earth). In other implementations, the driving environment 101 can be three-dimensional and can include objects that are capable of moving along all three directions (e.g., balloons, leaves, etc.). Hereinafter, the term "driving environment" should be understood to include all environments in which an autonomous motion of self-propelled vehicles can occur. The objects of the driving environment 101 can be located at any distance from the AV 100, from close distances of several feet (or less) to several miles (or more).

As described herein, in a semi-autonomous or partially autonomous driving mode, even though the AV 100 assists with one or more driving operations (e.g., steering, braking and/or accelerating to perform lane centering, adaptive cruise control, advanced driver assistance systems (ADAS), or emergency braking), the human driver is expected to be situationally aware of the AV's 100 surroundings and supervise the assisted driving operations. Here, even though the AV 100 may perform all driving tasks in certain situations, the human driver is expected to be responsible for taking control as needed.

Although, for brevity and conciseness, various systems and methods may be described below in conjunction with AVs 100, similar techniques can be used in various driver assistance systems that do not rise to the level of fully autonomous driving systems. In the United States, the SAE has defined different levels of automated driving operations to indicate how much, or how little, a vehicle is responsible for the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on the AV 100.

Lidar 112 can include one or more light sources producing and emitting signals and one or more detectors of the signals reflected back from the objects. In some implementations, lidar 112 can perform a 360-degree scan in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 configured to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more sonars 116, which can be ultrasonic sonars, in some implementations.

The AV 100 can include a data processing system 120. The data processing system 120 may include one or more computers or computing devices. The data processing system 120 may include hardware or software that receives data from the sensing system 110, processes the received data, and determines how the AV 100 should operate in the driving environment 101. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can include a positioning subsystem 122. The positioning subsystem 122 uses positioning data (e.g., global positioning system (GPS) data, inertial measurement unit (IMU) data, or other positioning data) to help accurately determine the location of the AV 100. The data processing system 120 may include a mapping subsystem 124. The mapping subsystem 124 may obtain or calculate map data (e.g., GPS data, geographic information systems (GIS) data, satellite data, traffic data, or other data) that may provide map information to the AV 100. The map data may include data that indicates one or more routes of LRVs or cable cars, and such data may be based on one or more rail tracks. In some implementations, the AV 100 may receive the positioning data or map data over a data network (e.g., a cellular network) from one or more servers. As such, the AV 100 may store temporary positioning data or map data, e.g., data relevant to the geographic area where the AV 100 is located.

The data processing system 120 can include a PUDO determination subsystem 126. The PUDO determination subsystem 126 is configured to determine whether a LRV or cable car in the driving environment 101 is in a PUDO state. The PUDO determination subsystem 126 may use sensor data from the sensing system 110, positioning data from the positioning subsystem 122, map data from the mapping subsystem 124, and other data to determine whether the LRV or cable car is in the driving environment. The PUDO determination subsystem 126 may use one or more PUDO determination MLMs 128. The PUDO determination subsystem 126 may format received data into a format compatible with the one or more PUDO determination MLMs 128 and input the data into the one or more PUDO determination MLMs 128 to generate an output usable by the AV control system (AVCS) 140, as discussed herein.

The data processing system 120 can include a trajectory prediction subsystem 130. The trajectory prediction subsystem 130 may be configured to receive sensor data from the sensing system 110 and determine trajectory information regarding the AV 100 or one or more objects in the driving environment 101. The trajectory prediction subsystem 130 may include one or more MLMs that may receive some of the sensor data and may perform inference calculations to determine trajectory information. The trajectory prediction subsystem 130 may send some of its output to the PUDO determination subsystem 126 to use in its PUDO state determination operations.

The data processed or generated by the data processing system 120, including the PUDO determination subsystem 126, can be used by the AVCS 140 of the AV 100. The AVCS 140 can include one or more algorithms that plan how the AV 100 is to behave in various driving situations and environments. For example, the AVCS 140 can include a navigation system for determining a global driving route to a destination point. The AVCS 140 can also include a driving path selection system for selecting a particular path through the immediate driving environment 101, which can include selecting a traffic lane, negotiating traffic congestion, choosing a place to make a U-turn, selecting a trajectory for a parking maneuver, and so on. The AVCS 140 can also include an obstacle avoidance system for safe avoidance of various objects or other obstructions (rocks, stalled vehicles, a jaywalking pedestrian, and so on) within the driving environment 101 of the AV 100. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles. The AVCS 140 can include a PUDO response system for selecting how to behave around a mass transit vehicle in a PUDO state.

Algorithms and modules of the AVCS 140 can generate control outputs for use by various systems and components of the AV 100, such as the powertrain, brakes, and steering 150, vehicle electronics 160, signaling 170, and other systems and components not explicitly shown in FIG. 1. These systems and components may modify the operations of the AV 100 based on the control output. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, an inside lighting system, a dashboard notification system, a passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

As used herein, the term "object" or "objects" can include any entity, item, device, body, or article (animate or inanimate) located outside the AV 100, such as other vehicles, cyclists, pedestrians, animals, roadways, buildings, trees, bushes, sidewalks, bridges, mountains, piers, banks, landing strips, or other things.

Figure 2:
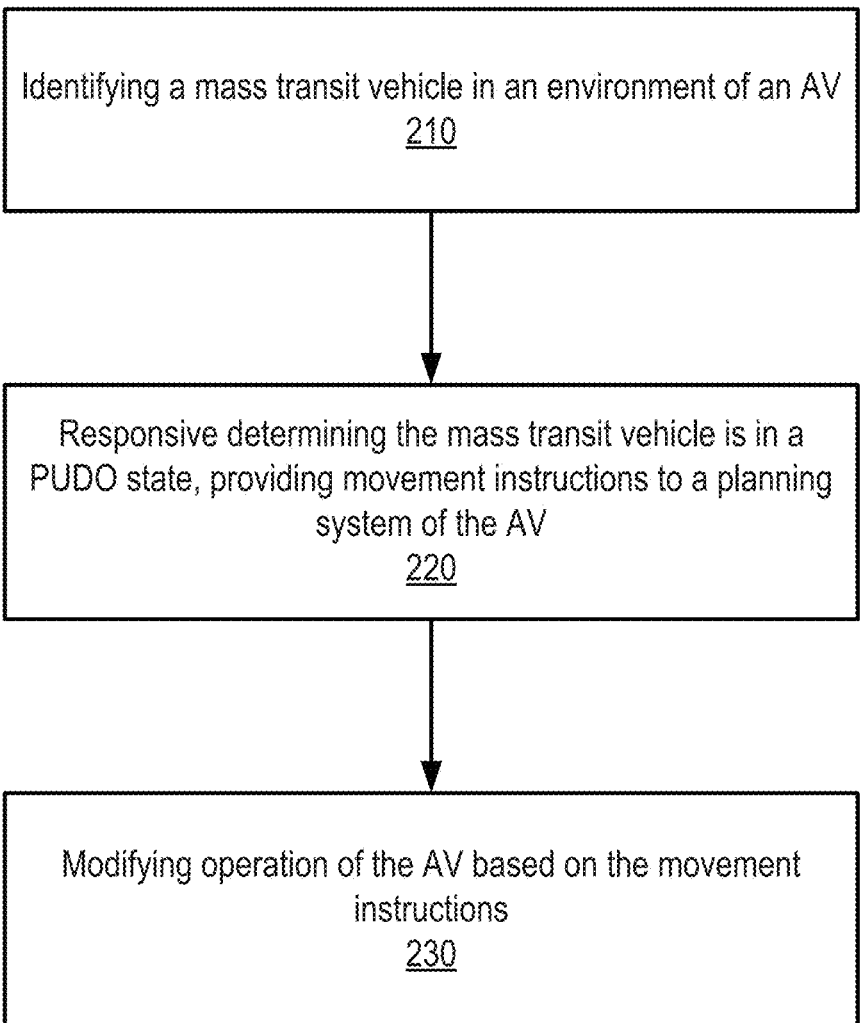
FIG. 2 depicts a flowchart diagram illustrating an example method for determining the PUDO state of a mass transit vehicle, in accordance with some implementations of the present disclosure.

FIG. 2 is a flowchart illustrating one embodiment of a method 200 for determining the PUDO state of a mass transit vehicle, in accordance with some implementations of the present disclosure. A processing device, having one or more central processing units (CPUs), one or more graphics processing units (GPUs), and/or memory devices communicatively coupled to the CPU(s) and/or GPU(s) can perform the method 200 and/or each of their individual functions, routines, subroutines, or operations. The method 200 can be directed to systems and components of a vehicle. In some implementations, the vehicle can be an AV, such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The method 200 can be used to improve performance of the AVCS 140. In certain implementations, a single processing thread can perform the method 200. Alternatively, two or more processing threads can perform the method 200, each thread executing one or more individual functions, routines, subroutines, or operations of the methods. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional.

At block 210, the method 200 includes identifying a mass transit vehicle in an environment 101 of the AV 100. The mass transit vehicle may include a LRV or a cable car. Identifying the mass transit vehicle may include the data processing system 120 determining if an object in the driving environment 101 is a mass transit vehicle. Identifying the mass transit vehicle can include the data processing system 120 determining whether the mass transit vehicle is a LRV or a cable car.

In one implementation, identifying the mass transit vehicle may include the PUDO determination subsystem 126 using sensor data to determine whether an object in the driving environment 101 is a mass transit vehicle. The PUDO determination subsystem 126 may obtain one or more camera images from a camera 118 of the sensing system 110, and the one or more camera images may include the object. The PUDO determination subsystem 126 may obtain lidar data regarding the object from the lidar 112. The PUDO determination subsystem 126 may input the one or more images or the lidar data into a PUDO determination MLM 128 of the one or more PUDO determination MLMs 128. The PUDO determination MLM 128 may be configured or may have been trained to perform operations to distinguish mass transit vehicles from other objects (e.g., using image recognition). The PUDO determination MLM 128 may output the specific type of mass transit vehicle indicated by the camera image(s) or lidar data.

In some implementations, different types of mass transit vehicles have different distances between the pair of rails (sometimes called the "track gauge") on which they travel. For example, a pair of rails that transport a LRV may have a first distance between them, and a pair of rails that transport a cable car may have a second distance between them, and the two distances may be different. Thus, in some implementations, in block 210, identifying the mass transit vehicle as a LRV or a cable car can include the PUDO determination subsystem 126 obtaining a distance between a pair of rails on which the mass transit vehicle is located. The distance may be based on sensor data from the sensing system 110 of the AV 100. The sensor data may include lidar 112 data, radar 114 data, or sonar 116 data. The sensor data may include a camera image from a camera 118 of the AV 100. The PUDO determination subsystem 126 may perform an image analysis on the camera image to calculate the distance. The distance may be based on map data of the mapping subsystem 124. The PUDO determination subsystem 126 may identify the mass transit vehicle as a cable car based on the distance between the pair of rails and a reference distance. The reference distance may include a predetermined distance known to be the distance between a pair of cable car rails for a certain cable car system.

In one implementation, at block 210, identifying the mass transit vehicle may include identifying the mass transit vehicle as a cable car based on map data from a mapping system of the AV 100. The map data may include one or more cable car routes. The map data may include locations of cable car routes, cable car PUDO zones, and other cable car-related locations. The PUDO determination subsystem 126 may receive the AV's 100 current location from the positional subsystem 122 or some other component of the AV 100. The PUDO determination subsystem 126 may determine the AV's 100 current location is within a threshold distance from a cable car route or PUDO zone, and if so, the PUDO determination subsystem 126 may determine that the vehicle is a cable car. The PUDO determination subsystem 126 may perform similar operations to identify the mass transit vehicle as a LRV.

At block 220, the method 200 includes determining whether the mass transit vehicle is in a PUDO state. Responsive to determining that the mass transit vehicle is in the PUDO state, the block 220 includes providing movement instructions to a planning system of the AV 100. The planning system may include the AVCS 140.

In some implementations, the PUDO determination subsystem 126 may determine the mass transit vehicle is in a PUDO state in response to obtaining sensor data from the sensing system 110 and applying a MLM that is onboard the AV 100 to the sensor data. The MLM may generate an output that may assist the PUDO determination subsystem 126 in determining whether the mass transit vehicle is in a PUDO state. The MLM may generate an output indicating the mass transit vehicle is in a PUDO state. The MLM may include a PUDO determination MLM 128, an MLM of the trajectory prediction subsystem 130, or some other MLM.

As discussed herein, the mass transit vehicle being in a PUDO state may include the mass transit vehicle currently picking up passengers or currently dropping off passengers. Picking up passengers may include one or more passengers being in the process of boarding the mass transit vehicle. Dropping off passengers may include one or more passengers being in the process of disembarking the mass transit vehicle. The mass transit vehicle being in a PUDO state may include the mass transit vehicle being in a temporal vicinity of the PUDO state. A mass transit vehicle may be in a temporal vicinity of a PUDO state when the mass transit vehicle is within a threshold distance of picking up or dropping off passengers. The mass transit vehicle being in a temporal vicinity of the PUDO state may include the mass transit vehicle being within a threshold time of picking up or dropping off passengers. Thus, in some implementations, the PUDO determination subsystem 126 may determine that the mass transit vehicle is in the PUDO state even if the mass transit vehicle is not currently picking up or dropping off passengers but is likely to do so soon. Thus, as used herein, the mass transit vehicle being "in a PUDO state" includes the mass transit vehicle currently picking up or dropping off passengers or being in the temporal vicinity of doing so.

In some implementations, the PUDO determination subsystem 126 may determine whether the mass transit vehicle is in a PUDO state based on one or more conditions. The one or more conditions can include the door position state of a door on the mass transit vehicle, the distance of the mass transit vehicle from a PUDO zone, the trajectory of the mass transit vehicle, the presence of certain pedestrian activity near the mass transit vehicle, or the presence of a traffic sign associated with the mass transit vehicle. The one or more conditions may include other conditions detected by the AV 100.

In some embodiments, determining whether the mass transit vehicle is in the PUDO state can include the PUDO determination subsystem 126 determining a door position state of a door on the mass transit vehicle. The door position state may include a position of a door of the mass transit vehicle. The door may be in an open position or a closed position. The sensing system 110 of the AV 100 may perform sensing operations and obtain data about a door of the mass transit vehicle. The sensing operations may include obtaining lidar 112, radar 114, or sonar 116 data. The sensing operations may include obtaining one or more camera 118 images. The PUDO determination subsystem 126 may use the sensor data to determine whether a door of the mass transit vehicle is in an open position or a closed position. In one embodiment, the PUDO determination subsystem 126 may use a PUDO determination MLM 128 that is configured or trained to determine a mass transit vehicle's door position. The PUDO determination MLM 128 may have been trained on data characterizing a door of a mass transit vehicle in various positions or configurations and a corresponding ground truth indicating whether the door is open or closed.

The PUDO determination subsystem 126 determining whether the mass transit vehicle is in a PUDO state may be based on a distance of the mass transit vehicle from a PUDO zone. A PUDO zone may include a LRV stop, a cable car stop, or some other area designated as a location where a LRV or cable car can pick up or drop off passengers. A PUDO zone may include one or more protective barriers or may be physically set apart from the street; however, in some cases, the PUDO zone may not include such protective features. In some embodiments, the location of a PUDO zone may be based on map data. The map data may include the location of one or more PUDO zones. In some implementations, the PUDO determination subsystem 126 may determine the location of a PUDO zone based on sensor data from the sensing system 110. The PUDO determination subsystem 126 may perform one or more operations on the sensor data to identify a PUDO zone (e.g., using image recognition on one or more camera 118 images) and calculate a distance from the mass transit vehicle to the PUDO zone.

Determining whether the mass transit vehicle is in a PUDO state can include the PUDO determination subsystem 126 determining whether the mass transit vehicle is within a threshold distance from a PUDO zone. The threshold distance may include the mass transit vehicle being in the PUDO zone (e.g., determining that the mass transit vehicle is a distance of 0 feet from the PUDO zone) or within some other distance from the PUDO zone (e.g., 25 feet (approx. 7.6 meters)).

In some implementations, the PUDO determination subsystem 126 may determine a distance from the mass transit vehicle to the PUDO zone. The PUDO determination subsystem 126 may obtain the location of the PUDO zone from the map data of the mapping subsystem 124. The PUDO determination subsystem 126 may calculate the location of the mass transit vehicle based on the location of the AV 100 (as based on the positioning data or map data), the distance between the AV 100 and the mass transit vehicle (as based on the sensor data), or other data (e.g., the length of the mass transit vehicle (as based on the sensor data or data stored by the data processing system 120)). The PUDO determination subsystem 126 may then calculate the distance from the mass transit vehicle to the PUDO zone based on their locations. In some implementations, the PUDO determination subsystem 126 may be able to determine the distance from the mass transit vehicle to the PUDO zone based on only the sensor data.

In one or more implementations, the PUDO determination subsystem 126 may determine whether the mass transit vehicle is in a PUDO state based on a trajectory of the mass transit vehicle. The trajectory prediction subsystem 130 may use sensor data to determine trajectory information for the mass transit vehicle. The trajectory information may include a current position of the mass transit vehicle, a current velocity of the mass transit vehicle, or a current acceleration of the mass transit vehicle. The trajectory information may include a predicted future position of the mass transit vehicle, a predicted future velocity of the mass transit vehicle, a predicted future acceleration of the mass transit vehicle, a predicted future path of the mass transit vehicle (which may include one or more predicted future positions of the mass transit vehicle and, for each position, a time when the trajectory prediction subsystem 130 predicts the mass transit vehicle will be in the respective position), or other trajectory information. The trajectory prediction subsystem 130 may send some of the trajectory information to the PUDO determination subsystem 126. In one embodiment, the PUDO determination subsystem 126 may determine whether the mass transit vehicle's velocity is under a threshold velocity. The threshold velocity may include the mass transit vehicle being at a complete stop (e.g., 0 miles per hour (mph)) or may be some other slow speed (e.g., 5 mph (approx. 8 kilometers per hour (kph))). Similarly, the PUDO determination subsystem 126 may determine that that mass transit vehicle's acceleration is under a threshold acceleration. The threshold acceleration may be under 0 (e.g., the mass transit vehicle is decelerating). In some embodiments, the PUDO determination subsystem 126 may determine a predicted future location of the mass transit vehicle, a predicted future velocity of the mass transit vehicle, or a predicted future acceleration of the mass transit vehicle. The PUDO determination subsystem 126 may receive this predicted future trajectory information from the trajectory prediction subsystem 130.

In some implementations, the PUDO determination subsystem 126 may determine whether there is certain pedestrian activity within a threshold distance of the mass transit vehicle. One type of pedestrian activity may include the gaze of a passenger. The sensor data may include data characterizing a gaze of a passenger of the mass transit vehicle or the gaze of a pedestrian within a threshold distance from the mass transit vehicle. The gaze of a passenger may assist the AV 100 in determining whether the passenger is disembarking or will disembark from the mass transit vehicle or whether the pedestrian is boarding or will board the mass transit vehicle, which may assist the AV 100 in determining whether the mass transit vehicle is in a PUDO state.

In some cases, a passenger may be located on an exterior portion of a cable car, especially when the occupancy of the cable car is high. The exterior portion may include an area outside the main cabin or even on the steps leading onto the cable car. It can be difficult to determine whether a passenger so near to the exit of the cable car is planning on disembarking or simply riding in that location because there is no other room on the cable car. Similarly, the gaze of a pedestrian may assist the AV 100 in determining whether the pedestrian is boarding or will board the mass transit vehicle. In some cases, it can be difficult in determining whether a pedestrian in a PUDO zone is planning on boarding an oncoming mass transit vehicle or is doing some other action (e.g., waiting for a different mass transit vehicle, waiting to cross the street, or simply standing around).

In some implementations, a PUDO determination MLM 128 of the one or more PUDO determination MLMs 128 may be configured or trained to determine if a passenger's or pedestrian's gaze indicates the mass transit vehicle is in the PUDO state. The sensor data can include lidar 112 data, radar 114 data, or sonar 116 data. The sensor data can include one or more camera images from the camera 118.

In one or more implementations, the sensing system 110, the data processing system 120, or the PUDO determination subsystem 126 may format the sensor data into a format compatible with the PUDO determination MLM 128. The format may include an embedding. An embedding can refer to any suitable digital representation of an input data, e.g., as a vector of any number of components, which can have integer values or floating-point values. Embeddings can be considered as vectors or points in an N-dimensional embedding space with the dimensionality N of the embedding space (defined as part of the MLM architecture) being smaller than the size of the input data.

The method 200 may include training the PUDO determination MLM 128 to recognize when a passenger's or a pedestrian's gaze indicates that the mass transit vehicle is in a PUDO state. Training the PUDO determination MLM 128 may include training the PUDO determination MLM 128 using a dataset. The dataset may include multiple records. Each record may include an example embedding and a corresponding ground truth. The ground truth May include data indicating that a passenger's or pedestrian's gaze indicates that the mass transit vehicle is in a PUDO state.

In some embodiments, each dataset record's embeddings may include an embedding generated from sensor data gathered by an AV (which may include the AV 100, an AV in a fleet of AVs to which the AV 100 belongs, or some other AV) or by some other vehicle (e.g., a vehicle driven by a human). The AV or vehicle may have recorded and stored the sensor data from actual driving scenarios, test driving scenarios, or other driving situations. The ground truth may include data indicating whether the corresponding embedding indicates the gaze of the pedestrian or passenger indicates that the mass transit vehicle is in a PUDO state. The ground truth data may include an annotation generated by software or generated by a human.

In one implementation, the training process may include dividing the dataset into a training dataset and a testing dataset. In some cases, the training process may include dividing the dataset into a training dataset, a validation dataset, and a testing dataset. During the training process of the PUDO determination MLM 128, the training dataset records are input into the PUDO determination MLM 128 to adjust the weights, biases, and other parameters and configurations of the PUDO determination MLM 128 based on whether the PUDO determination MLM 128 successfully predicted the ground truth of the associated record. In some cases, the validation dataset is input into the PUDO determination MLM 128, and certain hyperparameters of the PUDO determination MLM 128 are adjusted based on its output. The hyperparameters can include the number of neurons in a layer, the number of layers, which neurons are connected to each other with synapses, etc. Lastly, the testing dataset is input into the PUDO determination MLM 128 to test the PUDO determination MLM's 128 accuracy and, based on the accuracy, the PUDO determination MLM 128 may undergo further training. In some embodiments, the training process may include an unsupervised training process.

Applying the PUDO determination MLM 128 to the sensor data may include the sensing system 110, the data processing system 120, or the PUDO determination subsystem 126 formatting the sensor data into an embedding and the PUDO determination subsystem 126 inputting the embedding into the PUDO determination MLM 128. In response, the PUDO determination MLM 128 may perform an inference calculation and generate an output. The output may include data indicating whether the gaze of the passenger the mass transit vehicle indicates that the mass transit vehicle is in a PUDO state. The output may include a binary value (e.g., 0=not in the PUDO state, 1=in the PUDO state), a probability that the passenger's/pedestrian's gaze indicates that the mass transit vehicle is in a PUDO state (e.g., a value between the numbers 0 and 1 inclusive where values closer to 0 indicate a lower likelihood of the mass transit vehicle being in a PUDO state and where values closer to 1 indicate a higher likelihood of the mass transit vehicle being in a PUDO state), or some other output.

In some implementations, the PUDO determination subsystem 126 may determine whether the mass transit vehicle is in a PUDO state based on a trajectory of a pedestrian within a threshold distance of the mass transit vehicle. The trajectory prediction subsystem 130 may determine a trajectory of a pedestrian. The PUDO determination subsystem 126 may determine a distance of the pedestrian from the mass transit vehicle. In some cases, the PUDO determination subsystem 126 may detect the presence of one or more pedestrians in a PUDO zone, which may indicate whether a mass transit vehicle near the PUDO zone may be in the PUDO state.

In one or more implementations, the PUDO determination subsystem 126 may determine whether the mass transit vehicle is in a PUDO state based on the presence of a traffic sign associated with the mass transit vehicle. The PUDO determination subsystem 126 may obtain sensor data from the sensing system 110 of the AV 100. The sensor data can include data characterizing a traffic sign of the mass transit vehicle. The traffic sign may include a stop sign or some other sign that conventionally indicates for vehicles to stop.

In some cases, mass transit vehicles may include traffic signs that can indicate to vehicles around the mass transit vehicle to stop under certain conditions. However, sometimes, the traffic sign of the mass transit vehicle may not always indicate that vehicles should immediately stop. For example, the back of the mass transit vehicle may include an image of a stop sign next to text stating certain traffic regulations, such as "Do not pass cable car when passengers are loading/unloading." This stop sign does not indicate that a vehicle behind the mass transit vehicle should stop now but serves as a notice of the rules regarding passenger drop-off and pick-up. In another example, a cable car may include a stop sign that is manually operated (e.g., handled by an operator of the cable car, connected by a hinge to the cable car, etc.). The manually operated sign may not always accurately indicate when the cable car is in a PUDO state. For example, a passenger may handle the traffic sign, the operator may incorrectly operate the sign (e.g., extend it at the wrong time or leave it extended after passenger PUDO has been completed), or the sign may be inoperable and not extend when the cable car is in a PUDO state. Thus, the PUDO determination subsystem 126 accurately determining whether a traffic sign of the mass transit vehicle is indicative of a PUDO state of the mass transit vehicle can be important.

In one implementation, the sensing system 110 may obtain lidar 112, radar 114, or sonar 116 data that includes data associated with the traffic sign. The sensing system 110 may obtain one or more camera 118 images that may include a traffic sign of the mass transit vehicle. The PUDO determination subsystem 126 may perform image recognition operations to determine the location of the traffic sign. This may help the PUDO determination subsystem 126 to distinguish the traffic sign from a traffic sign disposed on a back of the mass transit vehicle or a stop sign elsewhere in the driving environment 101 (e.g., a conventional stop sign on a pole that is not associated with the mass transit vehicle).

The PUDO determination subsystem 126 may apply an MLM that is onboard the AV 100 to the sensor data to generate an output indicating whether the traffic sign is indicative of a PUDO state of the mass transit vehicle. In some cases, this may include the PUDO determination subsystem 126 using a PUDO determination MLM 128. The PUDO determination MLM 128 may be configured or trained to determine whether a traffic sign of the mass transit vehicle is indicative of the mass transit vehicle being in the PUDO state. For example, the PUDO determination MLM 128 may have been trained on a dataset that includes data characterizing traffic signs of mass transit vehicles in various positions or configurations and a ground truth indicating whether the traffic sign indicates the mass transit vehicle is in the PUDO state.

The PUDO determination subsystem 126 may determine whether the mass transit vehicle is in the PUDO state based on the one or more conditions discussed above (e.g., the door position state, the distance of the mass transit vehicle from a PUDO zone, the trajectory of the mass transit vehicle, pedestrian activity near the mass transit vehicle, presence of a traffic sign, etc.). In one embodiment, the PUDO determination subsystem 126 may include one or more algorithms or operations that determine whether a condition or a combination of conditions indicates that the mass transit vehicle is in the PUDO state. In some cases, an algorithm may determine that a single condition is indicative of the mass transit vehicle being in the PUDO state. In other cases, an algorithm may determine that a combination of two or more conditions indicates that the mass transit vehicle is in the PUDO state.

Figure 3A:
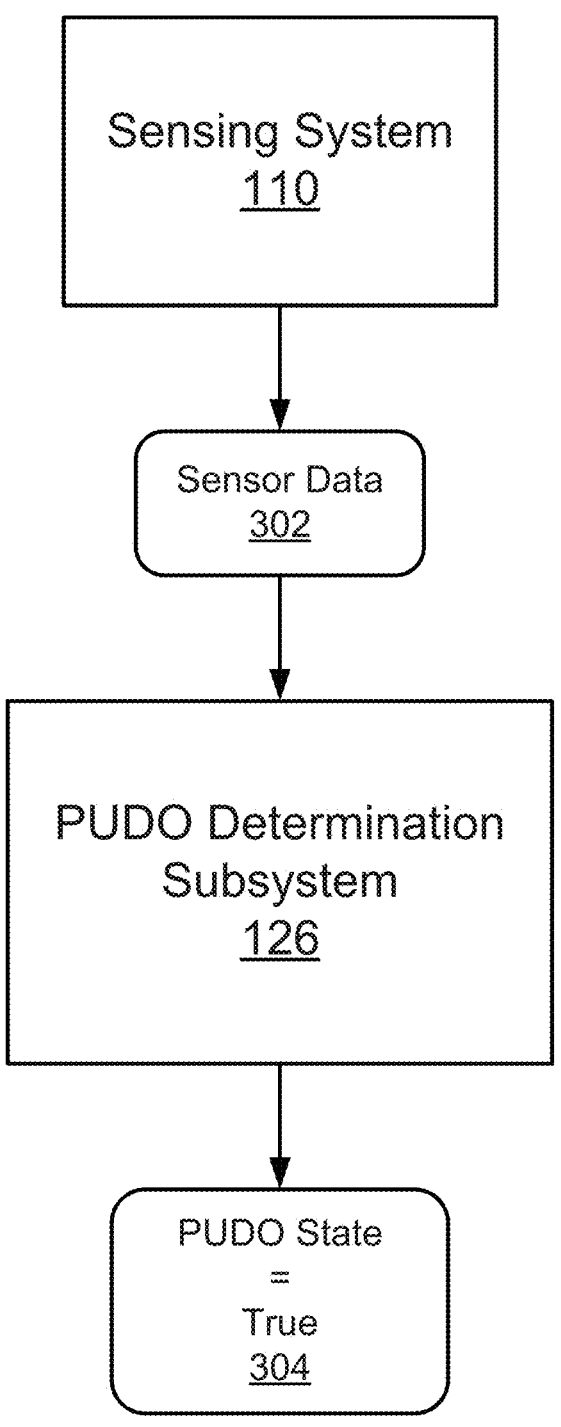
FIG. 3A depicts a flowchart illustrating an example flow of data for determining the PUDO state of a mass transit vehicle, in accordance with some implementations of the present disclosure.

FIG. 3A depicts an example data flow for determining whether a mass transit vehicle is in a PUDO state based on one or more conditions, in accordance with some implementations of the present disclosure. A sensing system, such as the sensing system 110, may provide the sensor data 302 to the PUDO determination subsystem 126. The PUDO determination subsystem 126 may determine one or more conditions from the sensor data 302 (e.g., a door position state of the mass transit vehicle, a trajectory of the mass transit vehicle, the presence of certain pedestrian activity within a threshold distance of the mass transit vehicle, etc.). The PUDO determination subsystem 126 may use the one or more algorithms or operations to determine whether a condition or a combination of conditions indicates that the mass transit vehicle is in the PUDO state. The PUDO determination subsystem 126 may generate an output 304 based on the results of the algorithms or operations.

In response to the PUDO determination subsystem 126 determining that the door of the mass transit vehicle is in the open position, the PUDO determination subsystem 126 may determine that the mass transit vehicle is in the PUDO state.

In response to the PUDO determination subsystem 126 determining that the mass transit vehicle is within the threshold distance to the PUDO zone, the PUDO determination subsystem 126 may determine that the mass transit vehicle is in the PUDO state. In some implementations, the PUDO determination subsystem 126 may determine that the mass transit vehicle is entering an intersection and that a passenger PUDO zone is within a threshold distance (e.g., 20 feet (approx. 6.1 meters)) from the intersection. In response, the PUDO determination subsystem 126 may determine that the mass transit vehicle is in the PUDO state.

In response to the PUDO determination subsystem 126 determining the mass transit vehicle's velocity is under a threshold velocity, the PUDO determination subsystem 126 may determine that the mass transit vehicle is in a PUDO state. In response to the PUDO determination subsystem 126 determining the mass transit vehicle's velocity is above a threshold velocity, the PUDO determination subsystem 126 may determine that the mass transit vehicle is not in a PUDO state. In response to the PUDO determination subsystem 126 determining the mass transit vehicle's acceleration is under a threshold acceleration, the PUDO determination subsystem 126 may determine that the mass transit vehicle is in a PUDO state. In response to the PUDO determination subsystem 126 determining the mass transit vehicle's acceleration is above a threshold acceleration, the PUDO determination subsystem 126 may determine that the mass transit vehicle is not in the PUDO state.

In some implementations, the PUDO determination subsystem 126 may combine the PUDO zone distance determination with the mass transit vehicle's velocity or acceleration determination to determine whether the mass transit vehicle is in a PUDO state. For example, in response to the PUDO determination subsystem 126 determining that the mass transit vehicle is within the threshold distance from a PUDO zone and the mass transit vehicle's velocity is under the threshold velocity, the PUDO determination subsystem 126 may determine that the mass transit vehicle is in the PUDO state. In response to the PUDO determination subsystem 126 determining that the mass transit vehicle is within the threshold distance from a PUDO zone and the mass transit vehicle's acceleration is under the threshold velocity, the PUDO determination subsystem 126 may determine that the mass transit vehicle is in the PUDO state. Thus, even if the mass transit vehicle is in or near a PUDO zone, if the mass transit vehicle is traveling too fast or is not decelerating, the PUDO determination subsystem 126 may determine that the mass transit vehicle is not in a PUDO state. Similarly, the PUDO determination subsystem 126 may determine that the mass transit vehicle is in a PUDO state in response the predicted future location of the mass transit vehicle being in a PUDO zone and the predicted future velocity or acceleration of the mass transit vehicle being below the threshold velocity or the threshold acceleration while at that predicted future location in the PUDO zone.

In some implementations, the PUDO determination subsystem 126 may determine that the mass transit vehicle is in a PUDO state in response to the mass transit vehicle's velocity being below a threshold velocity and the absence of an object in front of the mass transit vehicle. Similarly, the PUDO determination subsystem 126 may determine that the mass transit vehicle is in a PUDO state in response to the mass transit vehicle's acceleration being below a threshold acceleration and the absence of an object in front of the mass transit vehicle. If the mass transit vehicle is travelling slowly or is slowing down, and there is nothing in front of the mass transit vehicle causing it to travel slowly or slow down, the PUDO determination subsystem 126 may determine that the low speed or deceleration of the mass transit vehicle is due to the mass transit vehicle being in the temporal vicinity of performing passenger pick-up or drop-off, even if there is no PUDO zone nearby.

In response to the PUDO determination subsystem 126 determining that certain pedestrian activity indicates the mass transit vehicle is in the PUDO state, the PUDO determination subsystem 126 may determine that the mass transit vehicle is in the PUDO state. For example, in response to the PUDO determination subsystem 126 detecting the presence of one or more pedestrians in a PUDO zone and that the mass transit vehicle's velocity is below a threshold velocity or mass transit vehicle's acceleration is below a threshold acceleration, the PUDO determination subsystem 126 may determine that the mass transit vehicle is in the PUDO state.

In some implementations, the PUDO determination subsystem 126 may determine whether the mass transit vehicle is in a PUDO state based on a trajectory of a pedestrian within a threshold distance of the mass transit vehicle. The trajectory prediction subsystem 130 may determine a trajectory of a pedestrian. The PUDO determination subsystem 126 may determine a distance of the pedestrian from the mass transit vehicle. In response to the pedestrian being within the threshold distance of the mass transit vehicle and the pedestrian's trajectory being in a predetermined direction, the PUDO determination subsystem 126 may determine that the mass transit vehicle is in a PUDO state. The predetermined direction may include the pedestrian having a trajectory toward the mass transit vehicle. The trajectory may include a trajectory directly toward the mass transit vehicle. This may indicate that the pedestrian is headed toward the mass transit vehicle in order to board the mass transit vehicle. The predetermined direction may be away from the mass transit vehicle, including directly away from the mass transit vehicle. This may indicate that the pedestrian just disembarked from the mass transit vehicle.

In response to the PUDO determination subsystem 126 determining that the gaze of a passenger indicates the mass transit vehicle is in the PUDO state, the PUDO determination subsystem 126 may determine that the mass transit vehicle is in the PUDO state. The PUDO determination subsystem 126 may determine that the gaze of a passenger indicates the mass transit vehicle is in the PUDO state based on an output of a PUDO determination MLM 128. In some embodiments, the PUDO determination subsystem 126 may combine the passenger's gaze determination with one or more other conditions, such as the mass transit vehicle being within a threshold distance from a PUDO zone or the mass transit vehicle's velocity or acceleration being below a threshold velocity or acceleration, to determine whether the mass transit vehicle is in the PUDO state.

In response to the PUDO determination subsystem 126 determining that a traffic sign indicates the mass transit vehicle is in a PUDO state, the PUDO determination subsystem 126 may determine that the mass transit vehicle is in the PUDO state. The PUDO determination subsystem 126 may determine that the traffic sign is located at a side of the cable car and that this location indicates the mass transit vehicle is in a PUDO state. In response to the PUDO determination subsystem 126 determining that the traffic sign is not indicative of a PUDO state, the PUDO determination subsystem 126 may determine that the mass transit vehicle is not in the PUDO state. In some embodiments, the PUDO determination subsystem 126 may combine the traffic sign determination with one or more other conditions, such as the mass transit vehicle being within a threshold distance from a PUDO zone or the mass transit vehicle's velocity or acceleration being below a threshold velocity or acceleration, to determine whether the mass transit vehicle is in the PUDO state.

In some embodiments, the PUDO determination subsystem 126 may use a PUDO determination MLM 128 to determine whether the mass transit vehicle is in the PUDO state. In one or more implementations, the PUDO determination subsystem 126 may determine whether the mass transit vehicle is in a PUDO state based on sensor data from the sensing system 110, positioning data from the positioning subsystem 122, or map data from the mapping subsystem 124. The PUDO determination subsystem 126 may generate one or more embeddings based on the sensor data, positioning data, or map data, and one or more PUDO determination MLMs 128 may accept the one or more embeddings as input. In some implementations, the PUDO determination subsystem 126 may use a PUDO determination MLM 128 to determine whether the mass transit vehicle is in the PUDO state based on the one or more conditions discussed above (door position, distance to a PUDO zone, trajectory of the mass transit vehicle, etc.). The PUDO determination subsystem 126 may generate an embedding based on the one or more conditions. The PUDO determination subsystem 126 may input the embedding into the PUDO determination MLM 128.

In response to receiving at least some of the input discussed above, a PUDO determination MLM 128 may generate an output. The output may include data indicating whether the mass transit vehicle is in a PUDO state, a probability that the mass transit vehicle is in the PUDO state, or some other data indicative of whether the mass transit vehicle is in the PUDO state. The PUDO determination MLM 128 may have been trained on one or more dataset records, and each record may include an example embedding and a corresponding ground truth that indicates whether a mass transit vehicle is in a PUDO state.

Figure 3B:
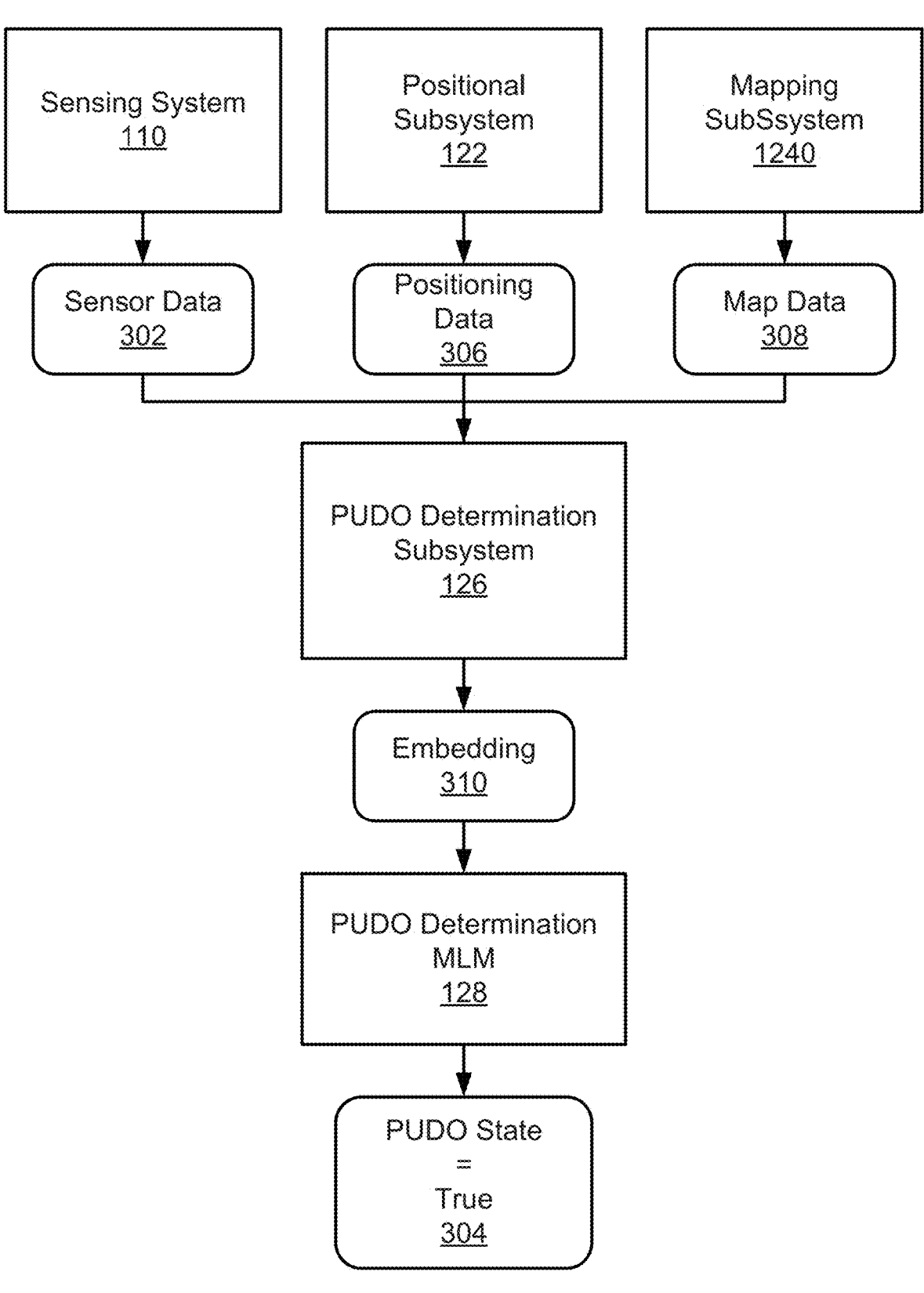
FIG. 3B depicts a flowchart illustrating another example flow of data for determining the PUDO state of a mass transit vehicle, in accordance with some implementations of the present disclosure.

FIG. 3B depicts an example data flow for using a PUDO determination MLM to determine whether a mass transit vehicle is in a PUDO state based, in accordance with some implementations of the present disclosure. The sensing system 110 may provide the sensor data 302 to the PUDO determination subsystem 126. The positional subsystem 122 may provide positioning data 306 to the PUDO determination subsystem 126. The mapping subsystem 124 may provide map data 308 to the PUDO determination subsystem 126. In one implementation, the PUDO determination subsystem 126 may use the sensor data 302, the positioning data 306, or the map data 308 to generate an embedding 310. In some implementations, the PUDO determination subsystem 126 may use the sensor data 302 to determine the one or more conditions, and the PUDO determination subsystem 126 may generate an embedding 310 based on the determinations of the one or more conditions. The PUDO determination subsystem 126 may input the embedding 310 into the PUDO determination MLM 128. The PUDO determination MLM 128 may perform an inference calculation to generate the output 304 indicating whether the mass transit vehicle is in the PUDO state.

Returning to FIG. 2, at block 220, in response to determining that the mass transit vehicle is in the PUDO state, the data processing system 120 may provide movement instructions to a planning system of the AV 100. The planning system may include the AVCS 140. In one embodiment, the PUDO determination subsystem 126 may send an output to the AVCS 140. The output may include the movement instructions. At block 230, the method 200 may include modifying operation of the AV 100 based on the movement instructions.

In one implementation, the movement instructions of block 220 may include data indicating that the mass transit vehicle is in the PUDO state. The data may include a signal, a notification, or some other data that indicates the vehicle is in the PUDO state. Modifying the operation of the AV 100 in block 230 may include the AVCS 140 using the movement instructions and other received data (e.g. sensor data from the sensing system 110) to determine how to operate various movement components of the AV 100 (e.g., the powertrain, brakes, and steering 150, the vehicle electronics 160, or the signaling 170).

In some implementations, the movement instructions of block 220 may include data indicating a location of the mass transit vehicle, data indicating the location of the AV 100, data indicating that the mass transit vehicle is in the PUDO state, data indicating the locations of other objects in the driving environment (e.g., pedestrians), or other information useful for the AVCS 140 to react to the mass transit vehicle being in the PUDO state. The movement instructions may include data indicating that the AVCS 140 should control the AV 100 such that the AV 100 stops at least a predetermined distance from the mass transit vehicle. The predetermined distance may include a distance programmed into the PUDO determination subsystem 126, the AVCS 140, or some other component of the AV 100. The predetermined distance may include a distance prescribed by traffic laws or regulations. Stopping behind the mass transit vehicle may include stopping in the same road lane as the mass transit vehicle or stopping in a different road lane than the mass transit vehicle, but latitudinally behind the mass transit vehicle. Modifying the operation of the AV 100 in block 230 may include the AVCS 140 using the movement instructions and other received data to determine how to operate various movement components of the AV 100 to stop the predetermined distance from the mass transit vehicle.

In one or more implementations, the movement instructions of block 220 may include data directing the AVCS 140 how to move the AV 100. The movement instructions may include step-by-step instructions that the AVCS 140 may carry out. Modifying the operation of the AV 100 in block 230 may include the AVCS 140 operating various movement components of the AV 100 as indicated by the movement instructions.

As an example, at block 220, the PUDO determination subsystem 126 may output movement instructions that include a signal indicating a mass transit vehicle is in a PUDO state. The PUDO determination subsystem 126 may provide the movement instructions to the AVCS 140. The trajectory prediction subsystem 130 may provide other data to the AVCS 140, including the position of the mass transit vehicle. In block 230, the AVCS 140 may process the movement instructions and other data and modify the operation of the AV 100. This may include the AVCS 140 determining how to operate the powertrain, brakes, and steering 150 of the AV 100 to slow down and stop at least a predetermined distance behind the mass transit vehicle. The AVCS 140 may operate the signaling 170 of the AV 100 to engage the brake lights of the AV 100, the emergency flashers of the AV 100, or some other signal of the AV 100.

In some implementations, in response to the PUDO determination subsystem 126 determining that the mass transit vehicle is not in a PUDO state, the PUDO determination subsystem 126 may not output anything to the AVCS 140 so that other systems of the AV 100 can provide instructions to the AVCS 140.

In some embodiments, the method 200 may include, after determining that the mass transit vehicle is in the PUDO state, determining whether the mass transit vehicle has exited the PUDO state. If the mass transit vehicle has exited the PUDO state, then the AV 100 may operate normally, including circumnavigating the mass transit vehicle.

In one implementation, responsive to the PUDO determination subsystem 126 determining that the mass transit vehicle is in the PUDO state, the PUDO determination subsystem 126 may determine that no pedestrians have boarded or disembarked from the mass transit vehicle for a first threshold time interval. The first threshold time interval may include three seconds. The first threshold time interval may include one second, two seconds, four seconds, five seconds, six seconds, seven seconds, or longer. The PUDO determination subsystem 126 may determine whether a pedestrian has boarded or disembarked from the mass transit vehicle by periodically receiving sensor data from the sensing system 110 and determining whether the sensor data indicates the presence of a pedestrian within a threshold distance of the mass transit vehicle. The PUDO determination subsystem 126 may use a PUDO determination MLM 128 configured or trained to detect pedestrians and apply the sensor data to the PUDO determination MLM 128. In some implementations, another subsystem of the data processing system 120 may detect the presence of a pedestrian within the threshold distance of the mass transit vehicle and send data indicating that detection to the PUDO determination subsystem 126.

The PUDO determination subsystem 126 may initiate a timer when it detects that the mass transit vehicle is in the PUDO state. Each time the PUDO determination subsystem 126 detects the presence of a pedestrian within the threshold distance of the mass transit vehicle (or receives the indication from another subsystem), the PUDO determination subsystem 126 may restart the timer. In response to the timer reaching the first threshold time interval, the PUDO determination subsystem 126 may determine that the mass transit vehicle is no longer in the PUDO state and may provide movement instructions to the AVCS 140.

The AVCS 140 may modify the operation of the AV 100 to at least partially circumnavigate the mass transit vehicle. At least partially circumnavigating the mass transit vehicle may include the AVCS 140 operating the powertrain, brakes, and steering 150 to turn the wheels of the AV 100 to avoid the mass transit vehicle (e.g., if the AV 100 is in the same road lane as the mass transit vehicle), accelerate and arrive at a certain velocity, and pass the mass transit vehicle. The AVCS 140 may operate the signaling 170 to engage a turn signal.

The PUDO determination subsystem 126 may cause the AV 100 to attempt to at least partially circumnavigate the mass transit vehicle after the first threshold time interval in order to obtain a better view of the mass transit vehicle. In some cases, where the entryways/exits of the mass transit vehicle are on the side, it can be difficult to determine, from behind the mass transit vehicle, if passengers are embarking or disembarking from the mass transit vehicle. Thus, moving the AV 100 to the side of the mass transit vehicle may provide a better observation location. In some embodiments, in response to the PUDO determination subsystem 126 detecting a passenger boarding or disembarking from the mass transit vehicle, the PUDO determination subsystem 126 may determine that the mass transit vehicle is in the PUDO state again.

In one or more implementations, the method 200 may include determining that the mass transit vehicle has been in the PUDO state for more than a second threshold time interval. The second threshold time interval may include a time longer than the first threshold time interval discussed above. The second threshold time interval may include a multiple of the threshold time interval (e.g., three times longer, four times longer, five times longer, six times longer or more). The second threshold time interval may include fifteen seconds. In response to the second threshold time interval passing since the PUDO determination subsystem 126 determined the mass transit vehicle is in the PUDO state, the PUDO determination subsystem 126 may determine that the mass transit vehicle has exited the PUDO state. The PUDO determination subsystem 126 may then provide movement instructions to the AVCS 140. The AVCS 140 may process the movement instructions and determine to at least partially circumnavigate the mass transit vehicle. The circumnavigation may include the AVCS 140 operating the AV 100 below a threshold velocity in case there still are passengers boarding or disembarking from the mass transit vehicle.

The PUDO determination subsystem 126 may use the second threshold time interval in order for the AV 100 to not become stuck behind the mass transit vehicle if the mass transit vehicle is no longer in the PUDO state, but the mass transit vehicle still indicates that it is in the PUDO state (e.g., because the operator left the doors of the mass transit vehicle open or left a stop sign extended). In some embodiments, in response to the PUDO determination subsystem 126 detecting a passenger boarding or disembarking from the mass transit vehicle, the PUDO determination subsystem 126 may determine that the mass transit vehicle is in the PUDO state again.

Figure 4:
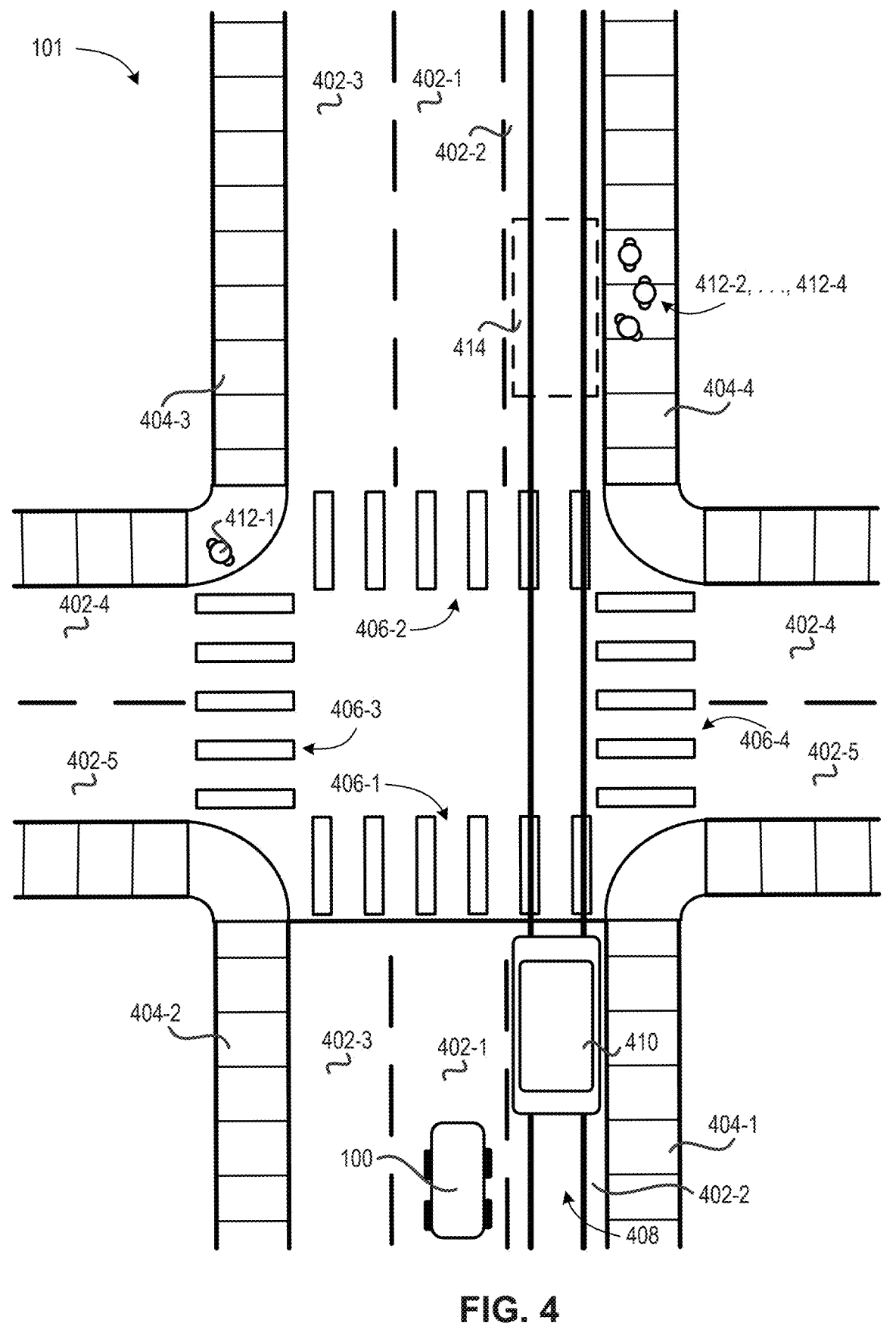

FIG. 4 is a diagram illustrating an example driving environment, in accordance with some implementations of the present disclosure. The driving environment, such as driving environment 101, may include the AV 100. The AV 100 may be configured to perform the method 200 to determine whether a mass transit vehicle is in a PUDO state and, if so, how the AV 100 should operate. The driving environment 101 may include one or more road lanes 402-1, . . . , 402-5. The AV 100 may be located in the road lane 402-1. The road lanes 402-1, . . . , 402-5 may meet and form an intersection.

The driving environment 101 of FIG. 4 may include one or more sidewalks 404-1, . . . , 404-4 located next to some of the one or more road lanes 402-1, . . . , 402-5. The driving environment 101 may include one or more crosswalks 406-1, . . . , 406-4 that may connect different sidewalks 406-1, . . . , 406-4 to each other. The driving environment 101 may include a pair of rails 408. The road lane 402-3 may include the pair of rails 408, and a cable car 410 may travel on the rails 408. The driving environment 101 may include one or more pedestrians 412-1, . . . , 412-4.

The AV 100 may, as part of block 210 of the method 200, identify the cable car 410 as a cable car-type mass transit vehicle. This may include the sensing system 110 of the AV 100 obtaining one or more camera 118 images of the pair of rails 408 and inputting the one or more camera 118 images into the PUDO determination subsystem 126. The PUDO determination subsystem 126 may use the one or more images to determine a distance between the two rails 408 and, based on that distance, determine that the cable car 410 is a cable car-type mass transit vehicle.

As part of block 220, the AV 100 may determine, based on the map data, that a PUDO zone 414 for a cable car 410 is located beyond the intersection. The PUDO determination subsystem 126 of the AV 100 may determine, from sensor data 302 and information from the trajectory prediction subsystem 130, that the cable car 410 is decelerating before it enters the intersection and that the PUDO zone 414 is located within a threshold distance from the intersection. In response, the PUDO determination subsystem 126 may determine that the cable car 410 is within a threshold vicinity of the PUDO state. The PUDO determination subsystem 126 may provide movement instructions to the AVCS 140 of the AV 100. The movement instructions may include instructions to slow down and stop the AV 100 a predetermined distance away from the back of the cable car 410 when the cable car 410 is in the PUDO zone 414.

As part of block 230, the AVCS 140 may modify the operation of the AV 100 based on the movement instructions. The AVCS 140 may control the powertrain, brakes, and steering 150 to remain in the road lane 402-1 and reduce the AV's 100 velocity to 0 at least the predetermined distance from the cable car 410 when the cable car 410 is in the PUDO zone 414. The AVCS 140 may engage the brake lights of the signaling 170 of the AV 100 when the AV 100 is slowing down and stopped.

Figure 5:
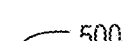
FIG. 5 depicts a flowchart diagram illustrating another example method for determining the PUDO state of a mass transit vehicle, in accordance with some implementations of the present disclosure.

FIG. 5 is a flowchart illustrating a method for determining the PUDO state of a mass transit vehicle, in accordance with some implementations of the present disclosure. A processing device, having one or more CPUs, one or more GPUs, and/or memory devices communicatively coupled to the CPU(s) and/or GPU(s) can perform the method 500 and/or each of their individual functions, routines, subroutines, or operations. The method 500 can be directed to systems and components of a vehicle. In some implementations, the vehicle can be an AV, such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The method 500 can be used to improve performance of the AVCS 140. In certain implementations, a single processing thread can perform the method 500. Alternatively, two or more processing threads can perform the method 500, each thread executing one or more individual functions, routines, subroutines, or operations of the methods. In an illustrative example, the processing threads implementing the method 500 can be synchronized (e.g., using semaphores, critical sections, and/or other thread synchronization mechanisms). Alternatively, the processing threads implementing the method 500 can be executed asynchronously with respect to each other. Various operations of the method 500 can be performed in a different (e.g., reversed) order compared with the order shown in FIG.

5. Some operations of the method 500 can be performed concurrently with other operations. Some operations can be optional.

At block 510, the method 500 includes determining a distance of a cable car 410 from a PUDO zone 414. The cable car 410 may be located in an environment 101 of the AV 100. The determination may be based on map data obtained from a mapping system of the AV 100. The mapping system may include the mapping subsystem 124.

In some implementations, the PUDO determination subsystem 126 may determine a distance from the cable car 410 to the PUDO zone 414. The PUDO determination subsystem 126 may obtain the location of the PUDO zone 414 from the map data of the mapping subsystem 124. The PUDO determination subsystem 126 may calculate the location of the cable car 410 based on the location of the AV 100 (as based on the positioning data or map data), the distance between the AV 100 and the cable car 410 (as based on the sensor data 302), or other data (e.g., the length of the cable car 410 (as based on the sensor data 302 or data stored by the data processing system 120)). The PUDO determination subsystem 126 may then calculate the distance from the cable car 410 to the PUDO zone 414 based on their locations. In some implementations, the PUDO determination subsystem 126 may be able to determine the distance from the cable car 410 to the PUDO zone 414 based on only the sensor data 302.

At block 520, the method 500 includes determining a velocity of the cable car 410 and the presence of one or more pedestrians 412 in the environment 101 of the AV 100. The determination may be based on sensor data 302 obtained from the sensing system 110 of the AV 100.

In one or more embodiments, block 520 may include the trajectory prediction subsystem 130 calculating the velocity of the cable car 410 based on the sensor data 302. The trajectory prediction subsystem 130 may send the velocity of the cable car 410 to the PUDO determination subsystem 126. In some implementations, the PUDO determination subsystem 126 or some other subsystem of the data processing system 120 may use the sensor data 302 as input and may determine the presence of the one or more pedestrians 412 in the driving environment 101. For example, an MLM configured or trained to recognize pedestrians 412 in the driving environment 101 may accept lidar 112 data, radar 114 data, or sonar 116 data, or one or more camera 118 images as input and may generate an output that includes data indicating the presence of one or more pedestrians 412 in the driving environment 101. The output may include the location(s), trajectory(ies), or other data of the pedestrians 412.

At block 530, the method 500 includes determining whether the cable car 410 is in a PUDO state. The determination may be based at least on the distance and velocity of the cable car 410 determined in block 520. In response to the cable car 410 being in the PUDO state, the AV 100 may modify its operation.

In one implementation, block 530 may include the PUDO determination subsystem 126 determining whether the cable car 410 is in the PUDO state (which may include determining whether the cable car 410 is in the temporal vicinity of the PUDO state, as discussed above). The PUDO determination subsystem 126 may determine whether the cable car 410 is in the PUDO state in response to the distance between the cable car 410 and the PUDO zone 414 being less than a threshold distance and the velocity of the cable car 410 being under a threshold velocity, as discussed above in relation to block 220 of the method 200.

In some implementations, block 530 includes modifying the operation of the AV 100. This may include the PUDO determination subsystem 126 providing movement instructions to the AVCS 140. The movement instructions may include data indicating that the cable car 410 is in a PUDO state and that the AV 100 should stop a threshold distance behind the cable car 410, as discussed above in relation to block 230 of the method 200. The PUDO determination subsystem 126 may determine whether the cable car 410 has exited the PUDO state based on one or more threshold time intervals (e.g., the first threshold time interval or the second threshold time interval, discussed above). In response to the PUDO determination subsystem 126 determining that the cable car is no longer in the PUDO state, the AVCS 140 may circumnavigate the cable car 410.

In some embodiments, some of the functionality or operations of the method 500 may be similar to one or more functions or operations described above in relation to the method 200 of FIG. 2.

In some embodiments, the data processing system 120 may be configured to cause the AV 100 to avoid streets, routes, and other locations with mass transit vehicle routes. This may be because such locations can become congested with mass transit vehicles, which can lead to longer travel times for the AV 100. This may especially be the case during times of heavy mass transit usage, such as the morning and evening rush hours, before and after events (sports games, music concerts, etc.), or other times of heavy traffic. The PUDO determination subsystem 126 may be configured to perform these functions.

In one implementation, the PUDO determination subsystem 126 may obtain map data from the mapping subsystem 124. The map data may include data that indicates one or more mass transit vehicle routes. The mass transit vehicle route data may include data indicating portions of streets that mass transit vehicles drive on, locations of mass transit vehicle stops, or other mass transit vehicle route data. The PUDO determination subsystem 126 may obtain a planned route of the AV 100. The planned route may have been generated by a subsystem of the data processing system 120, such as a navigation subsystem (not shown in FIG. 1). The planned route may include data indicating a starting location of the AV 100, a current location of the AV 100, a destination of the AV 100, portions of streets that the AV 100 will drive on to reach its destination, or other planned route data.

The PUDO determination subsystem 126 may determine whether the planned route is within a threshold distance of a mass transit vehicle route. The planned route being within the threshold distance of the mass transit vehicle route may include a portion of the planned route being within a threshold distance of a portion of one or more mass transit vehicle routes. For example, if the planned route overlaps with or intersects with a mass transit vehicle route, the distance between the two routes may be 0. The distance between the two routes may include a distance between their two closest points to each other. The PUDO determination subsystem 126 may use another metric of determining a distance between the two routes.

The PUDO determination subsystem 126 may determine whether the planned route of the AV 100 overlaps with a mass transit vehicle route by a threshold amount. Determining whether the two routes overlap may include calculating an amount by which the mass transit vehicle route overlaps the planned route. For example, the planned route may include a distance of 10 miles (approx. 16.1 kilometers (km)) and one or more mass transit vehicle routes may overlap with 1.5 miles (approx. 2.4 km) of the planned route.

Thus, the overlap amount may include 15%. The threshold amount of overlap may include 0%, 10%, 20%, 30%, or some other amount.

In response to the planned route of the AV 100 being within the threshold distance of the mass transit vehicle route or the mass transit vehicle route overlapping with the planned route by a threshold amount, the PUDO determination subsystem 126 may adjust the planned route. The PUDO determination subsystem 126 may change the portion of the planned route that is within the threshold distance to be further away from a mass transit vehicle route. The PUDO determination subsystem 126 may change the portion of the planned route that overlaps with a mass transit vehicle route so that the amount of overlap is less than the threshold amount of overlap. The PUDO determination subsystem 126 may change the portion of the planned route that overlaps with a mass transit route to avoid operating the AV 100 in a road lane 402 with rails 408 for mass transit vehicles.

In some embodiments, the mass transit route avoidance discussed above may include avoiding all mass transit vehicle routes indicating by the map data. In other implementations, the mass transit route avoidance may include avoiding one or more predetermined mass transit routes. The predetermined mass transit route(s) may include routes indicated by data received by the AV 100. Thus, mass transit routes not included in the predetermined mass transit routes may not be taken into account by the PUDO determination subsystem 126 when calculating the distance between the planned route or the overlap with the planned route.

In one or more implementations, the PUDO determination subsystem 126 may perform the mass transit route avoidance in response to a current time being within a predetermined time interval. The predetermined time interval may include the morning and evening rush hours, before and after events (sports games, music concerts, etc.), or other times of heavy traffic. The AV 100 may receive the predetermined time interval from a server in data communication with the AV 100.

Figure 6:
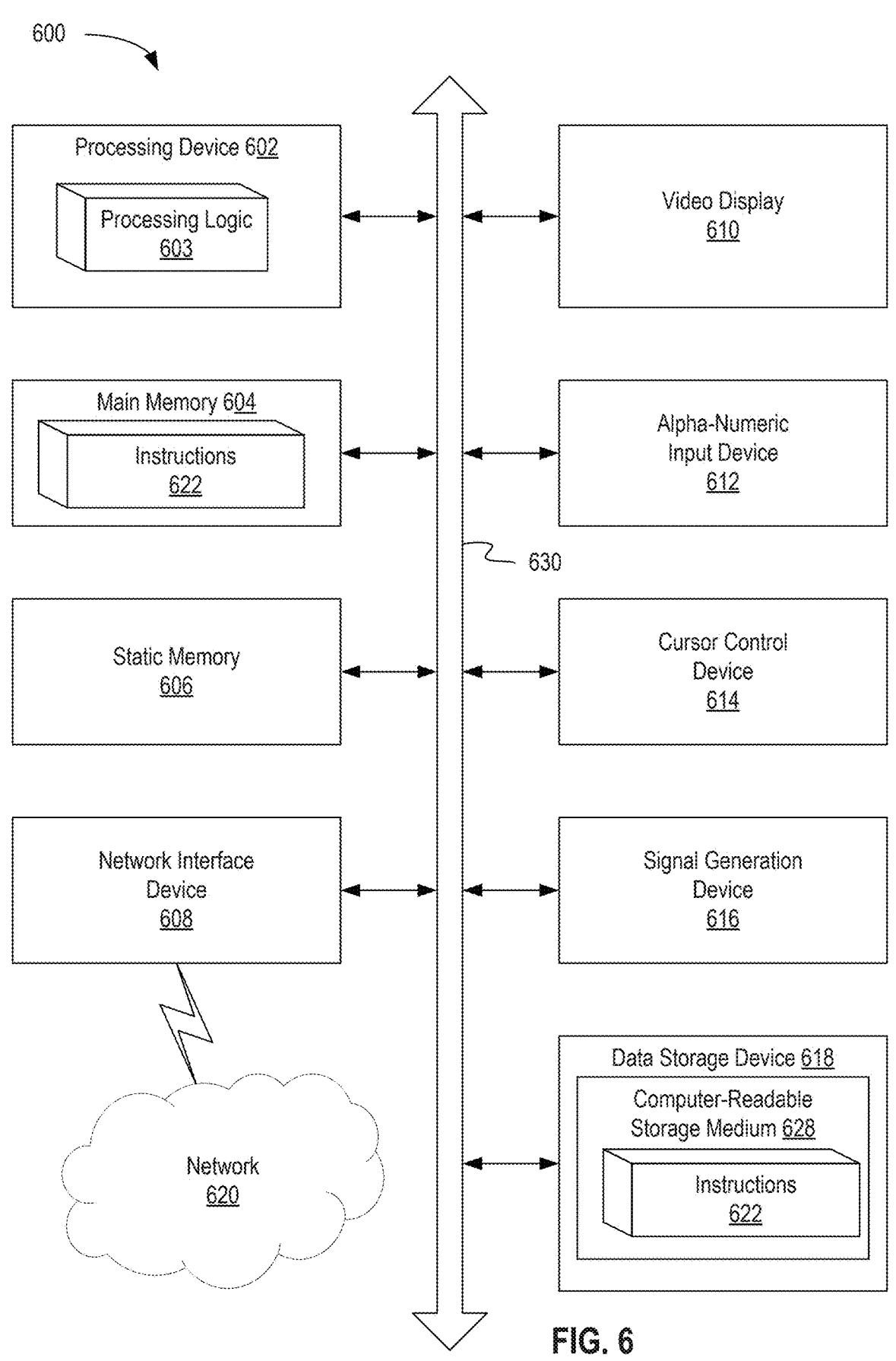
FIG. 6 depicts a block diagram of an example computer device capable of determining the PUDO state of a mass transit vehicle, in accordance with some implementations of the present disclosure.

FIG. 6 depicts a block diagram of an example computer device 600 capable of determining the PUDO state of a mass transit vehicle, in accordance with some implementations of the present disclosure. The example computer device 600 can be connected to other computer devices in a local area network (LAN), an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, CPU, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as a GPU, an application specific integrated circuit (ASIC), a field programmable gate array (FPGA), a digital signal processor (DSP), network processor, or the like. In accordance with one or more aspects of the present disclosure, processing device 602 can be configured to execute instructions performing methods 200 or 500 for determining the PUDO state of a mass transit vehicle.

Example computer device 600 can further comprise a network interface device 608, which can be communicatively coupled to a network 620. A network interface device 608 may include a network card, a network interface controller, or some other network interface. The network 620 may include a LAN, an intranet, an extranet, the Internet, a modem, a router, a switch, or some other network or network device. In some embodiments, the computer device 600 may be in data communication with other systems or device over the network 620. The example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions performing the methods 200 or 500.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

In some cases, certain components of the AV 100 (e.g., the sensing system 110, the data processing system 120, the AVCS 140, or other components) may include a computer device 600.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system, comprising:
   a memory; and
   one or more processing devices, coupled to the memory, configured to perform operations comprising:
   identifying a mass transit vehicle in an environment of an autonomous vehicle (AV);
   responsive to determining the mass transit vehicle is in a pick-up/drop-off (PUDO) state and that there is a lack of pedestrian activity involving boarding or disembarking from the mass transit vehicle for a threshold time interval, providing movement instructions to a planning system of the AV to at least partially circumnavigate the mass transit vehicle; and
   modifying operation of the AV based on the movement instructions.

2. The system of claim 1, wherein identifying the mass transit vehicle comprises:
   obtaining, based on sensor data from a sensing system of the AV, a distance between a pair of rails on which the mass transit vehicle is positioned; and
   identifying the mass transit vehicle as a cable car based on the distance between the pair of rails and a reference distance.

3. The system of claim 1, wherein identifying the mass transit vehicle comprises identifying a cable car based on map data from a mapping system of the AV, the map data comprising a plurality of cable car routes.

4. The system of claim 1, wherein determining the mass transit vehicle is in the PUDO state comprises determining, based on map data, at least one of:
   the mass transit vehicle is within a first threshold distance from a passenger PUDO zone; or
   the mass transit vehicle is entering an intersection, and the passenger PUDO zone is within a second threshold distance from the intersection.

5. The system of claim 1, wherein determining the mass transit vehicle is in the PUDO state comprises:
   obtaining sensor data from a sensing system of the AV, wherein the sensor data comprises data characterizing a gaze of a passenger of the mass transit vehicle; and
   applying a machine learning model (MLM) onboard the AV to the sensor data to generate an output indicating that the gaze of the passenger indicates that the mass transit vehicle is in the PUDO state.

6. The system of claim 1, wherein determining the mass transit vehicle is in the PUDO state comprises:
   obtaining sensor data from a sensing system of the AV, wherein the sensor data comprises data characterizing a gaze of a pedestrian within a threshold distance from the mass transit vehicle; and
   applying a MLM onboard the AV to the sensor data to generate an output indicating that the gaze of the pedestrian indicates that the mass transit vehicle is in the PUDO state.

7. The system of claim 1, wherein determining the mass transit vehicle is in the PUDO state comprises:
   obtaining sensor data from a sensing system of the AV, wherein the sensor data comprises data characterizing a trajectory of a pedestrian within a threshold distance from the mass transit vehicle; and
   applying a MLM onboard the AV to the sensor data to generate an output indicating that the trajectory of the pedestrian indicates the mass transit vehicle is in the PUDO state.

8. The system of claim 1, wherein determining the mass transit vehicle is in the PUDO state comprises determining a door position of a door of the mass transit vehicle, wherein the door position comprises at least one of an open position or a closed position.

9. The system of claim 1, wherein determining the mass transit vehicle is in the PUDO state comprises:
   obtaining sensor data from a sensing system of the AV, wherein the sensor data comprises data characterizing a traffic sign of the mass transit vehicle; and
   applying a MLM onboard the AV to the sensor data to generate an output indicating that the traffic sign indicates the mass transit vehicle is in the PUDO state.

10. A system, comprising:
    a memory; and
    one or more processing devices, coupled to the memory, configured to perform operations comprising:
    determining, based on map data obtained from a mapping system of an autonomous vehicle (AV), a distance of a cable car from a passenger pick-up/drop-off (PUDO) zone, wherein the cable car is located in an environment of the AV, and
    determining, based at least on the distance, that the cable car is in a temporal vicinity of a PUDO state and that there is a lack of pedestrian activity involving boarding or disembarking from the cable car for a first threshold time interval, and modifying operation of the AV to at least partially circumnavigate the cable car.

11. The system of claim 10, wherein:
    the operations further comprise determining an acceleration of the cable car; and
    determining the cable car is in the temporal vicinity of the PUDO state is further based on the cable car being under a threshold acceleration.

12. The system of claim 10, wherein determining the cable car is in the temporal vicinity of the PUDO state further comprises:
    obtaining, from sensor data, data characterizing a gaze of a pedestrian of the one or more pedestrians, wherein the pedestrian is located on an exterior portion of the cable car; and
    generating, using a machine learning (ML) model onboard the AV and based on the data characterizing the gaze of the pedestrian, an output indicating the pedestrian is disembarking from the cable car.

13. The system of claim 10, wherein autonomously modifying the operation of the AV comprises stopping the AV at least a predetermined distance from the cable car.

14. The system of claim 10, wherein determining that there is a lack of pedestrian activity involving boarding or disembarking from the cable car further comprises determining a presence of one or more pedestrians in the environment of the AV and that no pedestrians of the one or more pedestrians have boarded or disembarked from the cable car for the first threshold time interval.

15. The system of claim 10, wherein the operations further comprise, responsive to determining that the cable car has been in the temporal vicinity of the PUDO state for more than a second threshold time interval, further autonomously modifying the operation of the AV to at least partially circumnavigate the cable car.

16. The system of claim 10, wherein:
    sensor data comprises data characterizing a stop sign in the environment of the AV; and
    determining the cable car is in the temporal vicinity of the PUDO state comprises determining that the stop sign is located at a side of the cable car.

17. A method comprising:

identifying a mass transit vehicle in an environment of an autonomous vehicle (AV);

responsive to determining the mass transit vehicle is in a pick-up/drop-off (PUDO) state and that there is a lack of pedestrian activity involving boarding or disembarking from the mass transit vehicle for a threshold time interval, providing movement instructions to a planning system of the AV to at least partially circumnavigate the mass transit vehicle; and modifying operation of the AV based on the movement instructions.

18. The method of claim 17, wherein identifying the mass transit vehicle comprises:

obtaining, based on sensor data from a sensing system of the AV, a distance between a pair of rails on which the mass transit vehicle is positioned; and identifying the mass transit vehicle as a cable car based on the distance between the pair of rails and a reference distance.

19. The method of claim 17, wherein determining the mass transit vehicle is in the PUDO state comprises determining, based on map data, at least one of:

the mass transit vehicle is within a first threshold distance from a passenger PUDO zone; or the mass transit vehicle is entering an intersection, and the passenger PUDO zone is within a second threshold distance from the intersection.

20. The method of claim 17, wherein determining the mass transit vehicle is in the PUDO state comprises:

obtaining sensor data from a sensing system of the AV, wherein the sensor data comprises data characterizing a gaze of a passenger of the mass transit vehicle; and applying a machine learning model (MLM) onboard the AV to the sensor data to generate an output indicating that the gaze of the passenger indicates that the mass transit vehicle is in the PUDO state.

\* \* \* \* \*